UNITED STATES PATENT OFFICE.

JOHN HARVEY, OF LONDON, ENGLAND.

IMPROVEMENT IN PRESERVING FOOD.

Specification forming part of Letters Patent No. 193,509, dated July 24, 1877; application filed February 22, 1877.

*To all whom it may concern:*

Be it known that I, JOHN HARVEY, of the firm of Sir Charles Price & Co., of Upper Thames Street, in the city of London, England, have invented certain Improvements in the Means of Preserving Meat, Fish, and analogous substances, of which the following is a specification:

This invention relates to an improved process of preserving meat and other animal substances, in which sulphurous-acid gas is employed as the preservative agent.

The preservative properties of this gas have long been known, but the source from which it has been derived has rendered it difficult of application, besides which it has had a bad effect on the meat or other substance submitted to its action, imparting thereto an unpleasant taste and smell, due, it is believed, to the impurities inseparable from the gas as ordinarily manufactured.

According to my invention I employ sulphurous-acid gas produced by the combustion of bisulphide of carbon, and I thus obtain a gas free from the impurities above referred to.

The simplest mode of using the bisulphide of carbon for the production of sulphurous-acid gas is to ignite a quantity of the same in a shallow cup or saucer in the chamber or receptacle in which the meat, poultry, game, or fish intended to be subjected to the preservative action of the gas is placed. Owing to its great combustibility, the whole of the bisulphide will burn out clear when once it is set on fire, and the sulphurous acid produced during this burning will impregnate the air of the chamber and be brought in contact with all the meat, poultry, game, or fish contained therein.

According to my experience and judgment one ounce of bisulphide will produce enough sulphurous acid to impregnate a chamber about fourteen feet square and ten feet high; but no exact proportion need be laid down as to the quantity of the gas to be thrown into the air, because an excess of gas will not injure the meat, and experience may prove that a much smaller quantity than that named may be found sufficient.

Another convenient though less simple plan than that described, is to burn the bisulphide of carbon in a common spirit-lamp, using the liquid as the aliment of the lamp, and burning it from a wick like spirits of wine. In that case the lamp can be introduced into the chamber in which the meat, poultry, game, or fish is suspended or placed, and left to burn for a certain time. By means of a preparatory experiment the approximate rate of consumption of bisulphide in the lamp may be ascertained once for all, and so the quantity burned at any given time will be known with sufficient exactness.

When the quantity of bisulphide of carbon is known, the quantity of sulphurous acid which it will produce can very easily be calculated from the chemical equivalents of the substances, taking for the basis of the calculation that one hundred grains of bisulphide will produce, in burning, about one hundred and sixty-eight grains of sulphurous acid, which measure about two hundred and forty-five cubic inches.

Whether the bisulphide be burned from a cup or flat open vessel, or from a lamp such as that described, the quantity of sulphurous-acid gas produced by a given quantity of bisulphide is theoretically the same.

The sulphurous acid obtained by the combustion of bisulphide of carbon is free from all mineral impurities except carbonic acid, which is itself protective to meat, as it more or less excludes from the meat free oxygen. The sulphurous acid is, moreover, obtained in the nascent state, and is therefore in condition to be more effective than the same acid not in the nascent state.

The meat, fish, game, or poultry may remain in the chamber until it is required for use, or it may be removed soon after treatment and replaced by other animal substances requiring such treatment.

Supposing the invention to be applied to the contents of a butcher's shop, it will be convenient, when the shop is closed in the evening, to stop the free access of air thereto, and then to fill the apartment with the sulphurous-acid vapor, and leave it undisturbed until the morning.

If a tendency to taint or decay had shown itself this would be found to have been arrested, and the meat would prove as sweet as when it was just killed.

For preserving meat on board ship, I propose to fit up a chamber in any convenient part of the vessel to receive the fresh meat, and to burn bisulphide of carbon therein, as above explained, so soon as the meat has been placed in the chamber. This operation I propose to repeat from time to time, say at intervals of a week or more, taking care that the gas shall have free circulation over and around the several joints or carcasses. By this means I am enabled to transport fresh meat from distant countries in a state and at a cost which will enable the meat to compete in the home market with meat of home growth.

Having now explained the nature of my invention, I wish it to be understood that I claim—

The process of preserving meat, fish, and other animal substances above described, and consisting in subjecting such substances to the action of nascent sulphurous acid obtained free from injurious impurities by the combustion of bisulphide of carbon, substantially as specified.

Dated the 27th day of January, 1877.

JOHN HARVEY.

Witnesses:
  H. K. WHITE,
  CHARLES COLE.